(12) United States Patent
Cahill

(10) Patent No.: US 12,515,442 B2
(45) Date of Patent: Jan. 6, 2026

(54) COMPOSITE STRUCTURAL INSULATION PANELS AND METHODS OF MANUFACTURE

(71) Applicant: National Shelter Products, Inc., Hudson, OH (US)

(72) Inventor: John W. Cahill, Hudson, OH (US)

(73) Assignee: National Shelter Products, Inc., Hudson, OH (US)

( * ) Notice: Subject to any disclaimer, the term of this patent is extended or adjusted under 35 U.S.C. 154(b) by 0 days.

(21) Appl. No.: 19/248,809

(22) Filed: Jun. 25, 2025

(65) Prior Publication Data

US 2025/0319690 A1     Oct. 16, 2025

Related U.S. Application Data

(63) Continuation of application No. 18/675,238, filed on May 28, 2024.

(60) Provisional application No. 63/469,005, filed on May 25, 2023.

(51) Int. Cl.
| | |
|---|---|
| *B32B 21/04* | (2006.01) |
| *B32B 5/18* | (2006.01) |
| *B32B 7/02* | (2019.01) |
| *B32B 21/02* | (2006.01) |

(52) U.S. Cl.
CPC .............. *B32B 21/047* (2013.01); *B32B 5/18* (2013.01); *B32B 7/02* (2013.01); *B32B 21/02* (2013.01); *B32B 21/042* (2013.01); *B32B 2266/0228* (2013.01); *B32B 2307/304* (2013.01); *B32B 2307/712* (2013.01); *B32B 2307/7376* (2023.05); *B32B 2607/00* (2013.01)

(58) Field of Classification Search
CPC .......... B32B 21/047; B32B 2307/7376; B32B 2307/304; B32B 2307/712; B32B 5/18; B32B 7/02; B32B 21/02; B32B 21/042; B32B 2266/0228; B32B 2607/00
USPC ....................................... 428/292.4
See application file for complete search history.

(56) References Cited

U.S. PATENT DOCUMENTS

| | | |
|---|---|---|
| 10,316,515 B2 | 6/2019 | Budinscak, Jr. et al. |
| 11,585,089 B2 | 2/2023 | Brooks, III |
| 2009/0098357 A1 | 4/2009 | Bergtold et al. |
| 2022/0136247 A1* | 5/2022 | Brooks, III .............. B32B 5/266 52/794.1 |

* cited by examiner

*Primary Examiner* — Camie S Thompson
(74) *Attorney, Agent, or Firm* — Frost Brown Todd LLP

(57) ABSTRACT

Composite structural insulation panels are provided that can eliminate the need to embed mechanical fasteners into foam insulation, as this type of structural nailing requirement harms the panels weather barrier effectiveness and limits structural performance. The composite structural insulation panels can also provide improved fastener holding capability, improved structural performance, improved jobsite durability, and improved fire control.

20 Claims, 5 Drawing Sheets

COMPOSITE STRUCTURAL INSULATION PANELS AND METHODS OF MANUFACTURE

CROSS-REFERENCE TO RELATED APPLICATIONS

This application is a continuation of U.S. patent application Ser. No. 18/675,238, filed on May 28, 2024, which claims the benefit of U.S. Patent Application Ser. No. 63/469,005, filed on May 25, 2023, each of which are incorporated herein by reference in their entireties.

BACKGROUND

There is a need in the residential and commercial construction markets for an improved wall sheathing product.

BRIEF DESCRIPTION OF THE DRAWINGS

The present disclosure will be more readily understood from a detailed description of some example embodiments taken in conjunction with the following figures.

DETAILED DESCRIPTION

Figure 1:
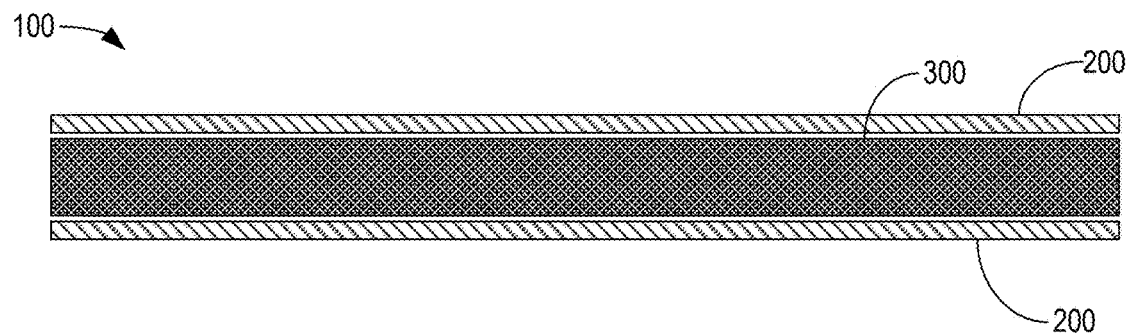
FIG. 1 depicts a composite structural insulation panel in accordance with an example non-limiting embodiment.

Various non-limiting embodiments of the present disclosure will now be described to provide an overall understanding of the principles of the structure, function, and use of the composite structural insulation panels as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the composite structural insulation panels and methods described herein. None of the features or components shown in the drawings or discussed below should be taken as mandatory for any specific implementation of any of these composite structural insulation panels and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible.

There is a need in the residential and commercial construction markets for a wall sheathing product that offers various functional values, such as structural, weather barrier, continuous insulation, construction site durability, and fire control. While conventional sheathing products may provide one or more of these properties, such products have value limiting challenges. Example composite structural insulation panels in accordance with the present disclosure, however, can add new value in several economically beneficial ways. By way of non-limiting examples, composite structural insulation panel in accordance with the present disclosure can eliminate the need to embed mechanical fasteners into the foam insulation, as this type of structural nailing requirement harms the panels weather barrier effectiveness and limits structural performance. Additionally, the presently disclosed composite structural insulation panel can eliminate one or more steps in the manufacturing process. Furthermore, example composite structural insulation panels can provide improved fastener holding capability, improved structural performance, improved jobsite durability, and improved fire control.

FIGS. 1-11 schematically depict various composite structural insulation panels 100 in accordance with the present disclosure. Each of the composite structural insulation panels 100 includes at least one layer that is a sheathing component 200 and at least one layer that is an insulation component 300. The overall thickness of the composite structural insulation panels 100 can vary based on the thickness of the various layers and the total number of layers. In some embodiments, the thickness of the composite structural insulation panels 100 is in the range of about 0.0625" to about 8" thick. The sheathing component 200 of various example composite structural insulation panels 100 illustrated in FIGS. 1-11 can be a relatively thin (i.e., about 0.010" to about 0.250" thick) structural component such as, without limitation, Dryline® TSX Structural Sheathing offered by National Shelter Products, Inc. Utilizing relatively thin structural component as the structural sheathing component 200 of the composite structural insulation panel 100 can help to minimize the thickness of the composite. By way of example, 0.105" Dryline® TSX and similar engineered fiber products provide structural value that is comparable to 7/16" (0.4375") wood-based products such as oriented strand board (OSB). For embodiments utilizing multiple different layers of the sheathing component 200, each layer can have the same thickness, or the thickness of the sheathing component 200 can vary between the various layers.

The sheathing component 200 can be, for example, an engineered fiberboard laminate which is a composite material formed from multiple layers of paperboard made from wood fibers or other cellulosic materials that are bonded together using various techniques and bonding agents to create a strong, stable, and durable panel. The bonding agents may include extruded polymer, adhesive, or a combination thereof. In some embodiments, the extruded polymer can be a thermoplastic or thermoset material that is applied to the paperboard layers through an extrusion coating process. The adhesive can be any suitable type of adhesive, such as a moisture-resistant or water-resistant adhesive, that is compatible with the paperboard layers and provides adequate bonding strength. In some embodiments, one or more of the paperboard layers within the engineered fiberboard laminate may be extrusion coated with a polymer material to enhance the moisture resistance, durability, or other properties of the sheathing layer. Alternatively, or in addition, one or more of the paperboard layers of the sheathing component 200 may be laminated to a plastic film or foil to provide additional barrier properties, such as water resistance, vapor resistance, or gas impermeability. The plastic film can be made from various polymeric materials, such as polyethylene, polypropylene, polyester, or nylon, while the foil can be an aluminum foil or other metallic foil that provides a high level of barrier protection.

The insulation component 300 utilized in the composite structural insulation panels 100 can be selected from a wide range of options. By way of example, the insulation component 300 can comprise expanded polystyrene, extruded expanded polystyrene, among other types of rigid, closed-cell foam materials. Other example types of foam insulation include polyisocyanurate materials, polyurethane materials, and phenolic materials. In some embodiments, the insulation component 300 can include a phase change material (PCM) insulation material.

Figure 2:
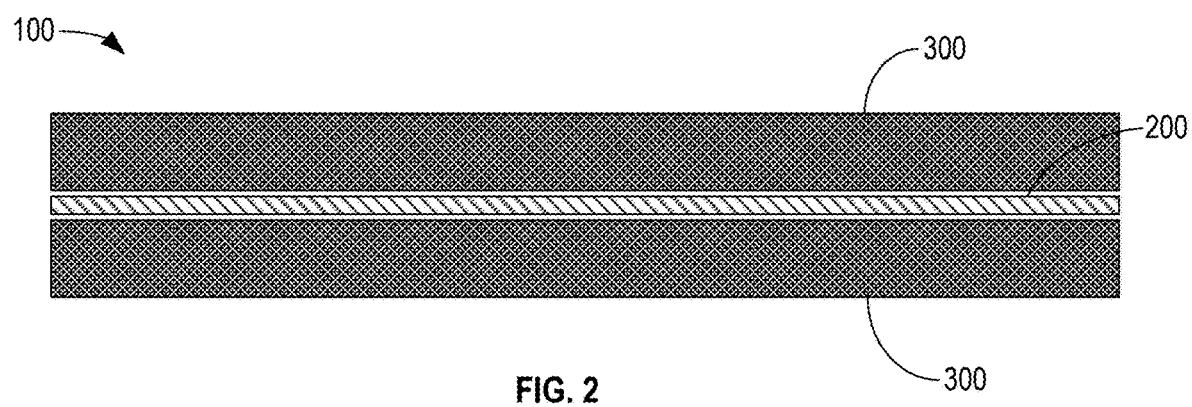
FIG. 2 depicts a composite structural insulation panel in accordance with an example non-limiting embodiment.
Figure 3:
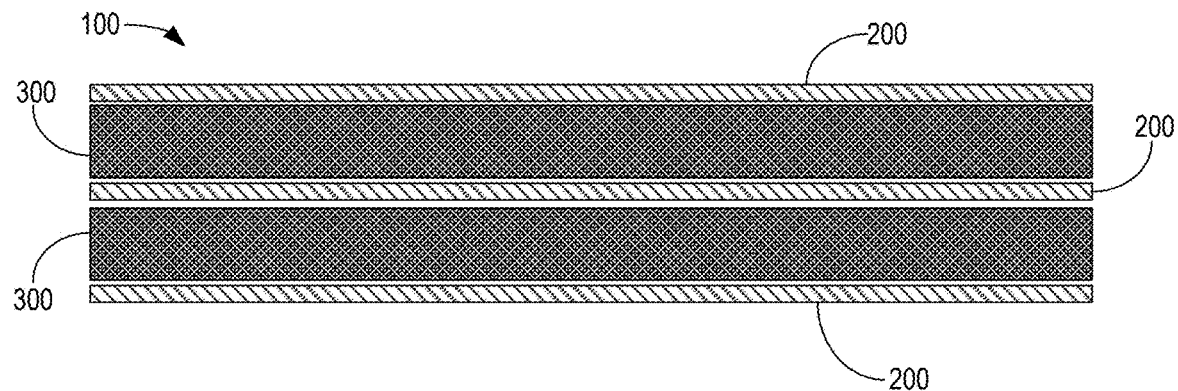
FIG. 3 depicts a composite structural insulation panel in accordance with an example non-limiting embodiment.

Referring now to FIG. 1, some example composite structural insulation panels 100 described herein can incorporate two or more structural sheathing components 200 on the surface of one insulation component 300 to create a structural beam. Alternatively, in some embodiments, as shown in FIG. 2, the sheathing component 200 can be laminated in between two or more insulation components 300, which can create an insulating structural beam. In some embodiments, as shown in FIG. 3, a sheathing component 200 can be on the surface and another sheathing component 200 can be positioned in between two or more insulation components 300.

The laminated configurations described herein can beneficially eliminate the need to drive the head of panel fasteners through or as deep into the insulation component thereby improving the panel's weather barrier properties. Additionally, incorporating two relatively thin structural components in thicknesses, such as Dryline® TSX, can support in-line lamination of the sheathing component(s) 200 and the insulation component(s) 300 during the composite insulation component manufacturing process.

Moreover, some insulation board products use facer materials such as films, matts, or foils to facilitate their manufacturing process and/or add weather barrier properties. By replacing these facer materials with a Dryline® TSX or similar products the cost of the current facer materials and the need for one or more secondary manufacturing processes may be eliminated.

Figure 4:
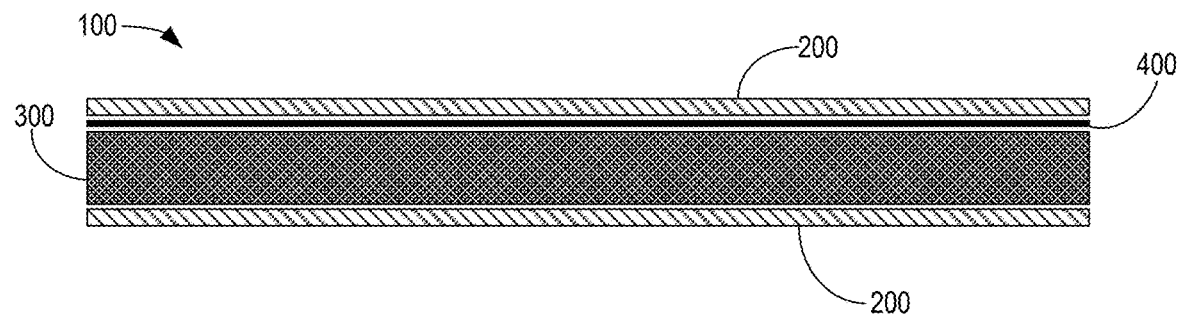
FIG. 4 depicts a composite structural insulation panel in accordance with an example non-limiting embodiment.

As shown in FIG. 4, composite structural insulation panels 100 in accordance with the present disclosure can optionally incorporate one or more additional layers (shown as layer 400 in FIG. 4) that can be any of a fiberglass, polymer, or metal sheet, film, fiber, mat, or fabric layer, or combinations thereof, either in the structural or insulation components, on the surface of the structural or insulation component(s), and/or between the insulation and the structural components(s). FIGS. 5-11 show additional examples of composite structural insulation panels 100 that incorporate one or more additional layers 400.

Figure 5:
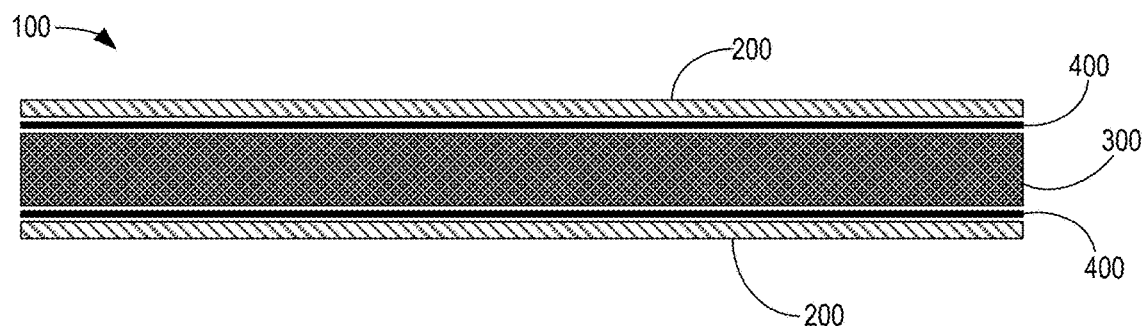
FIG. 5 depicts a composite structural insulation panel in accordance with an example non-limiting embodiment.
Figure 6:
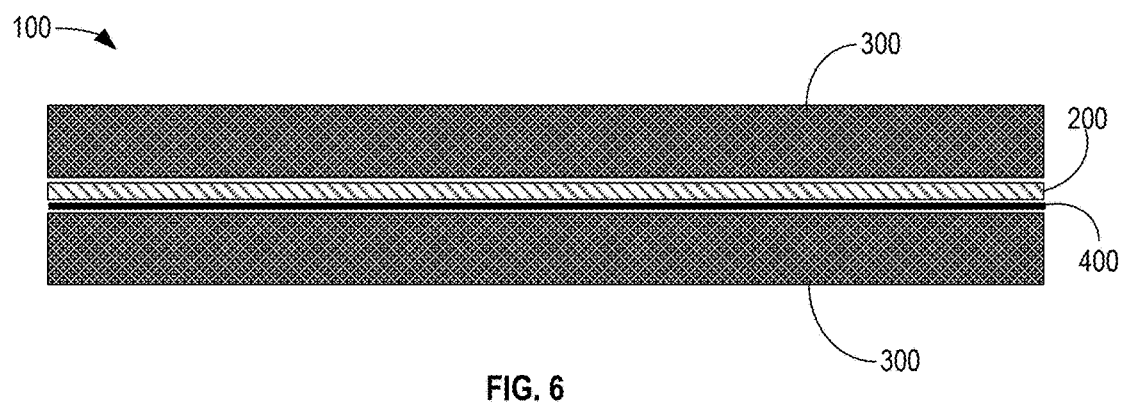
FIG. 6 depicts a composite structural insulation panel in accordance with an example non-limiting embodiment.
Figure 7:
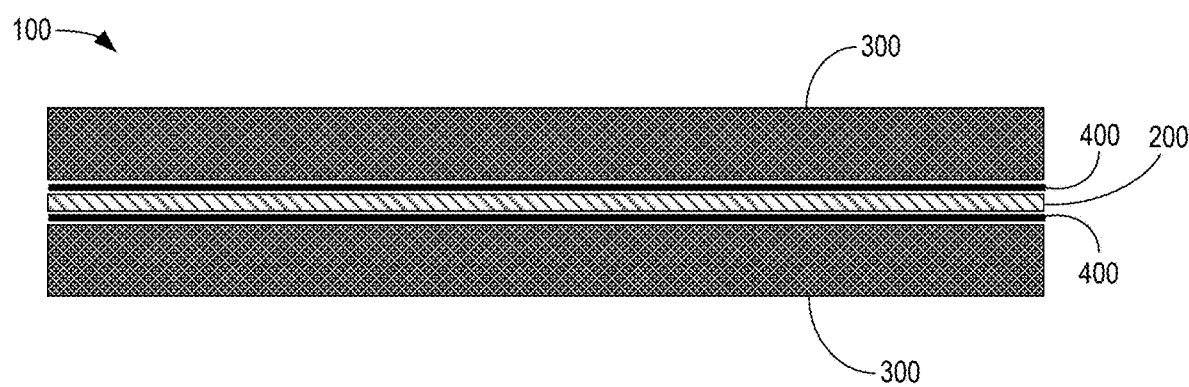
FIG. 7 depicts a composite structural insulation panel in accordance with an example non-limiting embodiment.

FIG. 5 shows an insulating structural beam, similar to FIG. 4, but with an additional layer 400 incorporated into the composite structural insulation panel 100 such that there is a layer 400 between both sheathing components 200 and the insulation component 300. FIG. 6 shows an insulating structural beam, similar to FIG. 2, but with an additional layer 400 incorporated into the composite structural insulation panel 100 between the sheathing component 200 and the insulation component 300. FIG. 7 shows another example of the insulating structural beam that has additional layers 400 positioned on both sides of the sheathing component 200.

Figure 8:
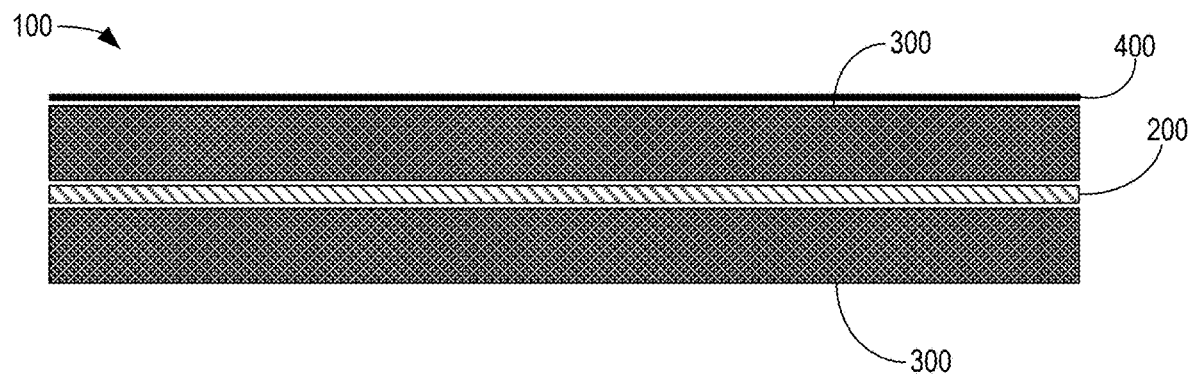
FIG. 8 depicts a composite structural insulation panel in accordance with an example non-limiting embodiment.
Figure 9:
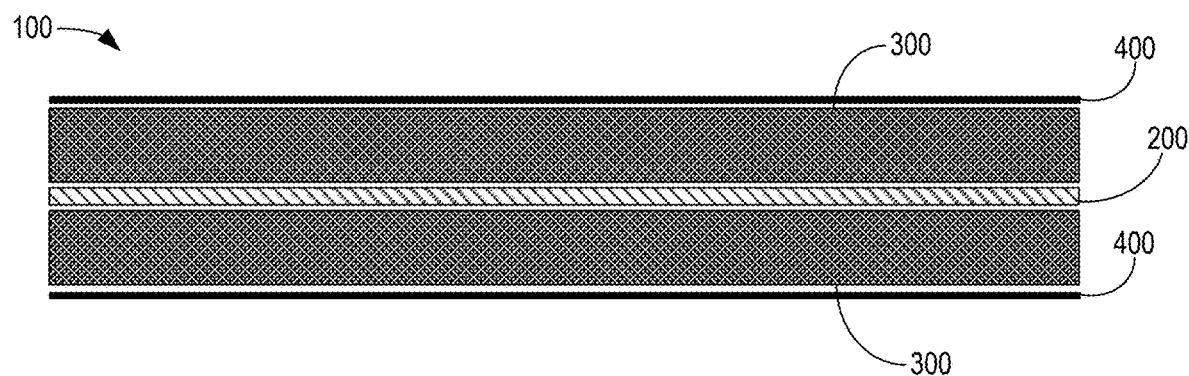
FIG. 9 depicts a composite structural insulation panel in accordance with an example non-limiting embodiment.

FIG. 8 shows an insulating structural beam, similar to FIG. 2, but with an additional layer 400 incorporated into the composite structural insulation panel 100 on the outer face of one of the insulation components 300. FIG. 9 shows another example of the insulating structural beam that has additional layers 400 positioned on the outer face of both insulation components 300.

Figure 10:
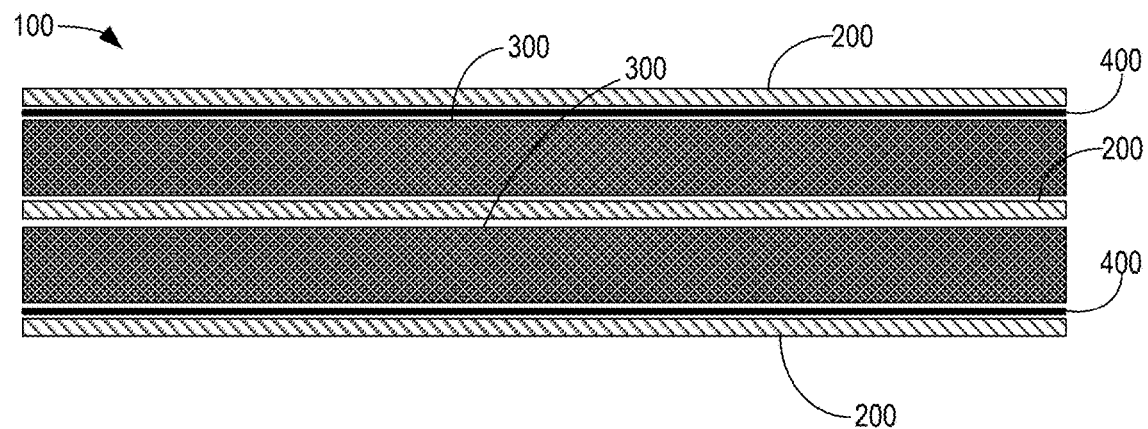
FIG. 10 depicts a composite structural insulation panel in accordance with an example non-limiting embodiment.
Figure 11:
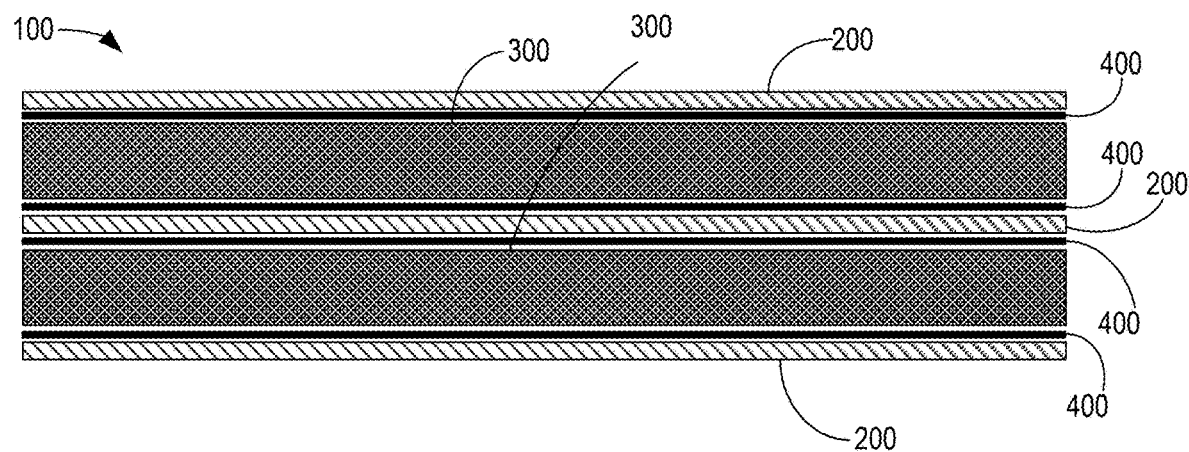
FIG. 11 depicts a composite structural insulation panel in accordance with an example non-limiting embodiment.

FIGS. 10 and 11 show that a composite structural insulation panel 100, similar to FIG. 3, can include one or more additional layers 400 positioned at various interfaces of the sheathing component 200 and the insulation component 300. FIG. 10 depicts the use of an additional layer 400 between each of the outermost sheathing components 200 and the adjacent insulation component 300. FIG. 11 shows the use of two additional layers 400 that are positioned on either face of the inner sheathing component 200.

The use of one or more of these layers 400, non-limiting examples of which are shown in FIGS. 4-11, can help to prevent fastener pull through, improve structural performance, improve fastener holding capability, improve fire control, and allow the use of thinner structural components to achieve design compliant structural values at lower manufacturing costs. Composite structural insulation panels in accordance with the present disclosure can optionally incorporate one or more fiberglass, polymer, or metal fabricated, molded, or stamped parts onto the surface of the structural or insulation component(s) and/or between the insulation and structural components(s). The use of one or more of these components can help prevent fastener pull through and improve structural performance. This approach can also facilitate the use of thinner structural components to achieve design compliant structural values and the lowest manufacturing cost.

Moreover, some composite structural insulation panels can include a fiberglass, polymer, or metal sheet, film, fiber, mat, and/or fabric layer (i.e., layer 400) and also incorporate one or more fiberglass, polymer, or metal fabricated, molded, or stamped parts onto the surface of the structural or insulation component(s) or between the insulation and structural components(s). As provided above, such approach can help to prevent fastener pull through, improve structural performance, improved fastener holding capability, improve fire control, and allow the use of thinner structural components to achieve design compliant structural values at lower manufacturing costs. Additionally, this approach can also facilitate the use of thinner structural components to achieve design compliant structural values and the lowest manufacturing cost.

Composite structural insulation panels 100 in accordance with the present disclosure can incorporate full coverage adhesive between all or some of the components to improve cohesive structural performance of the composite. In some embodiments, fire resistant or retarding coatings or components like gypsum or magnesium can be provided in or between layers to provide fire control capabilities. Moreover, moisture vapor permeable coatings, components, or discontinuous adhesive application processes can be incorporated to add moisture vapor control capability within the composite.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

I claim:

1. A structural insulation panel, comprising:
   an insulation core comprising a single, continuous layer of extruded expanded polystyrene;
   a first structural sheathing layer disposed on and bonded to a first side of the insulation core, wherein the first structural sheathing layer comprises a polymer; and
   a second structural sheathing layer disposed on and bonded to a second, opposing side of the insulation core, wherein the second structural sheathing layer comprises a polymer; wherein the first and second structural sheathing layers each have a thickness of about 0.010 inches to about 0.250 inches.

2. The structural insulation panel of claim 1, wherein at least one of the first structural sheathing layer or the second structural sheathing layer further comprises a fiber material.

3. The structural insulation panel of claim 2, wherein the fiber material comprises fiberglass fibers.

4. The structural insulation panel of claim 1, wherein at least one of the first structural sheathing layer or the second structural sheathing layer comprises a fabric layer.

5. The structural insulation panel of claim 1, wherein the first structural sheathing layer and the second structural sheathing layer each comprise a polymer sheet.

6. The structural insulation panel of claim 1, wherein at least one of the first structural sheathing layer or the second structural sheathing layer comprises a mat material.

7. The structural insulation panel of claim 1, wherein the polymer comprises polypropylene.

8. The structural insulation panel of claim 1 comprising a fire-retarding component disposed in or between one or more layers of the panel.

9. A structural insulation panel, comprising:
   a single, continuous insulation core comprising extruded expanded polystyrene, the insulation core having an overall thickness in the range of about 0.5 inches to about 3.0 inches;
   a first polymer sheet disposed directly on and bonded to a first side of the single, continuous insulation core, the first polymer sheet functioning as a structural sheathing layer; and
   a second polymer sheet disposed directly on and bonded to a second, opposing side of the single, continuous insulation core, the second polymer sheet functioning as a structural sheathing layer;
   wherein the first polymer sheet and the second polymer sheet each have a nominal thickness of about 0.010 inches to about 0.250 inches.

10. The structural insulation panel of claim 9, wherein the panel provides a water-resistive barrier.

11. The structural insulation panel of claim 9, wherein at least one of the first polymer sheet or the second polymer sheet further comprises a fiber material.

12. The structural insulation panel of claim 9, wherein the panel eliminates the need to embed mechanical fasteners into foam insulation.

13. The structural insulation panel of claim 9, wherein the first polymer sheet and the second polymer sheet each comprise a film material.

14. The structural insulation panel of claim 9, wherein the extruded expanded polystyrene provides thermal insulation properties.

15. A structural insulation panel comprising exactly three layers of material, wherein the three layers consist of a first polymer sheet, a single continuous layer of extruded expanded polystyrene disposed between and bonded to the first polymer sheet and a second polymer sheet, and the second polymer sheet, wherein the first polymer sheet and the second polymer sheet each have a thickness of about 0.010 inches to about 0.250 inches, and wherein the single continuous layer of extruded expanded polystyrene has a thickness in the range of about 0.5 inches to about 3.0 inches.

16. The structural insulation panel of claim 15, wherein at least one of the first polymer sheet or the second polymer sheet further comprises a fiber material.

17. The structural insulation panel of claim 16, wherein the fiber material comprises fiberglass fibers.

18. The structural insulation panel of claim 15, wherein at least one of the first polymer sheet or the second polymer sheet comprises a fabric layer.

19. The structural insulation panel of claim 15, wherein at least one of the first polymer sheet or the second polymer sheet comprises a mat material.

20. The structural insulation panel of claim 9, wherein the panel is configured to prevent fastener pull-through.

* * * * *